(12) United States Patent
Ji et al.

(10) Patent No.: US 11,100,283 B2
(45) Date of Patent: Aug. 24, 2021

(54) METHOD FOR DETECTING DECEPTIVE E-COMMERCE REVIEWS BASED ON SENTIMENT-TOPIC JOINT PROBABILITY

(71) Applicant: SHANDONG UNIVERSITY OF SCIENCE AND TECHNOLOGY, Qingdao (CN)

(72) Inventors: Shujuan Ji, Qingdao (CN); Luyu Dong, Qingdao (CN); Chunjin Zhang, Qingdao (CN); Qi Zhang, Qingdao (CN); Da Li, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 16/769,009

(22) PCT Filed: Aug. 14, 2018

(86) PCT No.: PCT/CN2018/100372
§ 371 (c)(1),
(2) Date: Jun. 2, 2020

(87) PCT Pub. No.: WO2019/218508
PCT Pub. Date: Nov. 21, 2019

(65) Prior Publication Data
US 2021/0027016 A1    Jan. 28, 2021

(30) Foreign Application Priority Data
May 16, 2018   (CN) .......................... 201810464828.0

(51) Int. Cl.
*G06F 40/30*   (2020.01)
*G06F 40/216*   (2020.01)

(52) U.S. Cl.
CPC ............ *G06F 40/216* (2020.01); *G06F 40/30* (2020.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS 8,630,975 B1 * 1/2014 Guo .................. G06F 16/24578
707/608
9,836,183 B1 * 12/2017 Love ................... G06F 16/9024
(Continued)

OTHER PUBLICATIONS

Ahuja et al., Ahuja, Microblog Sentiment Topic Model, 2016, IEEE International Conference on Data Mining Workshops, pp. 1031-1038 (Year: 2016).*
(Continued)

*Primary Examiner* — Lamont M Spooner
(74) *Attorney, Agent, or Firm* — Hauptman Ham, LLP (57) ABSTRACT

Provided is a method for detecting deceptive e-commerce reviews based on a sentiment-topic joint probability, which belongs to the fields of natural language processing, data mining and machine learning. In the data of different fields, a STM model is superior to other reference models; compared with other models, the STM model belongs to a completely un-supervised (no label information) statistic learning method and shows great advantages in processing unbalanced large sample dataset. Thus, the STM model is more suitable for application in a real e-commerce environment.

1 Claim, 5 Drawing Sheets

(56) References Cited

U.S. PATENT DOCUMENTS

| | | | | |
|---|---|---|---|---|
| 10,445,356 | B1* | 10/2019 | Mugan | G06N 3/084 |
| 10,489,792 | B2* | 11/2019 | Hackman | G06N 3/084 |
| 2013/0018651 | A1* | 1/2013 | Djordjevic | G06Q 10/00 704/9 |
| 2013/0080212 | A1* | 3/2013 | Li | G06Q 10/10 705/7.38 |
| 2013/0282430 | A1* | 10/2013 | Kannan | G06Q 30/06 705/7.29 |
| 2014/0188780 | A1* | 7/2014 | Guo | G06N 7/005 706/52 |
| 2016/0171391 | A1* | 6/2016 | Guo | G06F 16/24573 706/12 |
| 2017/0243382 | A1* | 8/2017 | Banerjee | G06T 11/206 |
| 2017/0323065 | A1* | 11/2017 | Proctor Beauchamp | A61B 5/165 |
| 2018/0121539 | A1* | 5/2018 | Ciulla | G06F 16/3344 |
| 2018/0165554 | A1* | 6/2018 | Zhang | G06K 9/6256 |
| 2018/0285345 | A1* | 10/2018 | Pradhan | G06F 40/30 |
| 2018/0357531 | A1* | 12/2018 | Giridhari | G06N 20/00 |
| 2019/0114485 | A1* | 4/2019 | Chan | H04N 21/4223 |
| 2019/0354765 | A1* | 11/2019 | Chan | G06K 9/00744 |
| 2020/0074181 | A1* | 3/2020 | Chang | G06K 9/00744 |

OTHER PUBLICATIONS

International Search Report issued in corresponding International Application No. PCT/CN2018/100372, dated Feb. 19, 2019, National Intellectual Property Administration, PRC, Beijing, China.

Written Opinion issued in corresponding International Application No. PCT/CN2018/100372, dated Feb. 19, 2019, State Intellectual Property Office of the P.R. China, Beijing, China.

Chinese Search Report issued in corresponding Chinese Patent Application No. 2018104648280, dated May 16, 2018.

First Office Action issued in corresponding Chinese Patent Application No. 2018104648280, dated Jan. 29, 2019.

Notification to Grant Patent Right for Invention issued in corresponding Chinese Patent Application No. 2018104648280, dated Mar. 4, 2019.

* cited by examiner

METHOD FOR DETECTING DECEPTIVE E-COMMERCE REVIEWS BASED ON SENTIMENT-TOPIC JOINT PROBABILITY

RELATED APPLICATIONS

The present application is a U.S. National Phase of International Application Number PCT/CN2018/100372, filed Aug. 14, 2018, and claims the priority of Chinese Application No. 2018104648280, filed May 16, 2018.

TECHNICAL FIELD

The present invention belongs to the fields of natural language processing, data mining and machine learning, and particularly relates to a method for detecting deceptive e-commerce reviews based on a sentiment-topic joint probability.

BACKGROUND

With the popularity of intelligent mobile devices and the development of Internet, people's consumption concepts and consumption patterns have changed at different degrees, and online shopping becomes a common consumption manner for the people. After purchasing a product or service, consumers will post their opinions and sentiments on a product homepage. As a result, these massive online historical reviews provide rich information resources for sellers and buyers. However, C2C e-commerce platforms have the characteristics of information asymmetry, that is, the buyers know little about the sellers' information. Therefore, before making a purchase decision, the buyers often consult the experiences of previous users for the products through reviews, hoping to get useful information to make a right purchase decision rationally. This online review mechanism does help to provide indirect communication between users and sellers. On one hand, the sellers can realize better targeted marketing through reviews; on the other hand, the users can also find satisfactory products by consulting the review information of historical transactions.

Studies have shown that consumer feedbacks can greatly influence the purchasing motivation of potential consumers. When the users obtain a large number of negative reviews on a product review page, 80% of the users may change their original purchase decisions. In addition, the vast majority of the users are more willing to purchase the products after seeing positive reviews. After studying consumer reviews of a foreign review site Yelp, Luca et al. found that whenever consumers' score of hotel reviews increase by one star, hotel revenue will increase by 5%-9% accordingly.

Because online reviews are crucial to consumer decisions and merchant interests, some merchants use deceptive reviews to confuse the consumers. Due to existence of the loopholes of the review mechanism of the e-commerce websites, illegal merchants may hire spammers to write false comments to confuse the consumers so as to improve their benefits and reputations. These reviews will not only mislead consumers' decisions but also reduce the benefits of reputable sellers. Therefore, how to filter out deceptive reviews to help users to avoid adverse selection and make correct decisions becomes a challenge problem that researchers have been working to overcome. Therefore, in the present invention, a sentiment-topic probability model (STM) is used to mine a sentiment-topic joint probability of the reviews as an evidence for distinguishing true reviews from deceptive reviews, and then a classifier is used to determine whether the reviews are true or deceptive.

As we all know, customers usually make reviews and express their sentiments for a particular aspect when commenting on the products or services. For example, the contents of the Yelp review text have two main characteristics: one is that the contents of the review text are often reviews of a specific product or service aspect; the other is that the corresponding sentiment tendency information is also expressed when reviewing the text aspect. Based on the behavioral habits of the people for writing reviews, we propose following hypothesis.

Hypothesis 1: In the review text, the expressed sentiment is dependent on a specific topic (aspect).

In order to describe the hidden topic and sentiment information of the text mentioned above, this present invention puts forward a sentiment topic joint probability model (STM). The model extends a sentiment level on the basis of the LDA model and extracts topic information and corresponding sentiment information from the review text. Compared to the JST and ASUM models which are also sentiment-topic mixed models, the STM model is similar to the JST and ASUM models in that they add the sentiment level based on the LDA model. In this case, the model is extended to a four-level model: a document level, a topic level, a sentiment level and a word level.

The biggest differences between the STM model and both of the JST and ASUM models that consider both sentiment and topic factors are as follows: the structure of the JST and ASUM models is "document-sentiment (only positive and negative sentiments herein) -topic-word", and the topic depends on the sentiment, that is, there is one topic distribution under each sentiment; the STM model have the structure of "document-topic-sentiment-word", and the sentiment generation is dependent on the topic, that is, there is one sentiment distribution under each topic. The four-level structure of "document-topic-sentiment-word" of the STM model is more in line with the ideology of reviewers when writing reviews. In addition, the ASUM model assumes that the words of the same topic in a review tend to be adjacent words, and at the same time, words used to make sentiment reviews on this topic also tend to be adjacent words. Therefore, the ASUM model assumes that the words of the same single sentence are all derived from the same topic and sentiment, that is, the sentence is the smallest unit of topic and sentiment. Such constraint settings are not always applicable in practice. The essential difference between the STM model and the reversed JST model that considers both sentiment and topic factors is that the former is a completely unsupervised learning method, while the latter is a semi-supervised learning method.

SUMMARY

In view of the foregoing technical problems in the prior art, the present invention proposes a method for detecting deceptive e-commerce reviews based on a sentiment-topic joint probability. The method is reasonably designed to overcome the shortcomings of the prior art, generating good effects.

The method for detecting deceptive e-commerce reviews based on a sentiment-topic joint probability is firstly defined as follows:

A STM model is a 9-tuple, STM=($\alpha$, $\beta$, $\mu$, $\bar{\theta}$, $\bar{\delta}$, $\bar{\varphi}$, $z_{m,n}$, $s_{m,n}$, $w_{m,n}$), where:

α is a hyper parameter that reflects a relative strength hidden between topic and sentiment.

μ is a hyper parameter that reflects a sentiment probability distribution over topic.

β is a hyper parameter that reflects a word probability distribution.

$\vec{\theta}$ is a K-dimensional Dirichlet random variable, which is a topic probability distribution matrix.

$\vec{\delta}$ is a K*T-dimensional Dirichlet random variable, which is a sentiment probability distribution matrix.

$\vec{\varphi}$ is a K*T*N-dimensional Dirichlet random variable, which is a word probability distribution matrix.

$z_{m,n}$ is a topic to which the n-th word of a document m belongs.

$s_{m,n}$ is a sentiment to which the n-th word of the document m belongs.

$w_{m,n}$ is a basic unit of discrete data, which is defined as a word indexed by n in the document m.

The method for detecting deceptive e-commerce reviews based on a sentiment-topic joint probability includes the following steps:

at step 1: initializing the hyper parameters α, β, μ of the STM model;

at step 2: setting the appropriate numbers of the topic and the sentiment, and maximum iterations of Gibbs sampling;

at step 3: training the STM model until the model stabilizes and converges;

at step 4: inputting the sentiment-topic joint probability matrix $\vec{\delta}$ calculated by the STM model as a feature into a classifier for training;

at step 5: inputting new unlabeled samples into the STM model and training the STM model to calculate the sentiment-topic joint probability matrix $\vec{\delta}$ of the new unlabeled samples as the feature;

at step 6: inputting the sentiment-topic joint probability matrix $\vec{\delta}$ of the new unlabeled samples into the trained classifier for prediction; and at step 7: outputting new sample labels through the classifier.

The beneficial technical effects brought by the present invention are as follows:

With the data of different fields, the STM model outperforms the reference models. Compared with other models, the STM model shows a larger advantage in processing unbalanced big sample data set. As a result, the STM model is more applicable to the real e-commerce environment.

BRIEF DESCRIPTION OF THE DRAWINGS

FIG. 4 is a schematic diagram of performance of a model on balanced hotel dataset, where.

FIG. 5 is a schematic diagram of performance of the model on unbalanced hotel dataset, where.

FIG. 6 is a schematic diagram of performance of the model on balanced restaurant dataset, where.

FIG. 7 is a schematic diagram of performance of the model on unbalanced restaurant dataset, where.

DETAILED DESCRIPTION OF THE EMBODIMENTS

The present invention is further described in detail below with reference to the drawings and specific embodiments:

1. The Sentiment-Topic Joint Probability Model 1.1 the Idea of Model

Figure 1:
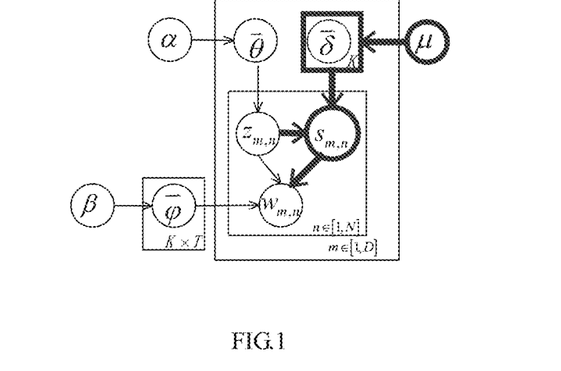
FIG. 1 is a probability graph of a STM model.

FIG. 1 presents a probability graph of the STM model. The part in the black box represents a part of the sentiment level of the extended LDA model. In FIG. 1, an arc from α to $\vec{\theta}$ represents a process of generating a topic probability distribution vector for each document based on the Dirichlet (a) function, that is, $\vec{\theta}$=Dirichlet (α); an arc from μ to $\vec{\delta}$ represents a process of generating a sentiment probability distribution vector for each implied topic based on the Dirichlet (μ) function, that is, $\vec{\delta}$=Dirichlet (μ); an arc from β to $\vec{\varphi}$ represents a process of generating a word probability distribution vector for each implied topic and sentiment based on the Dirichlet (β) function, that is, $\vec{\varphi}$=Dirichlet (β). An arc from $\vec{\theta}$ to $z_{m,n}$ represents a process of randomly selecting atopic $z_{m,n}$ from document-topic multinomial distribution for the word $w_{m,n}$ in each document $d_m$. An arc from $\vec{\delta}$ to $s_{m,n}$ and an arc from $z_{m,n}$ to $s_{m,n}$ represent a process of randomly selecting one sentiment $s_{m,n}$ from the document-topic-sentiment multinomial distribution for the word $w_{m,n}$ the document $d_m$ under the condition of a given topic. The arcs from $\vec{\varphi}$ to $w_{m,n}$, $z_{m,n}$ to $w_{m,n}$, $s_{m,n}$ to $w_{m,n}$ represents a process of selecting a word $w_{m,n}$ from the topic-sentiment-word multinomial distribution under the condition that the topic $z_{m,n}$ and sentiment $s_{m,n}$ are known.

Suppose we have a document set containing D documents, where D is defined as D={$d_1$, $d_2$, . . . $d_m$}, the document d is a word sequence of length $N_d$, d is defined as d={$w_1$, $w_2$, . . . $w_m$}, and the dictionary size of the document set is V. The process of generating a document by STM model is formalized as follows:

(1) For each topic z and each sentiment choosing a probability vector $\varphi_{zs}$ representing generation of each word, $\varphi_{zs}$ obeying the Dirichlet distribution with the hyper parameter β, that is, $\varphi_{zs}$□ Dirichlet (β);

(2) For Each Document d a. choosing a probability vector θ representing generation of a topic, θ obeying the Dirichlet distribution with the hyper parameter α, which is θ□ Dirichlet (α);

b. Given a topic, choosing a probability vector δ representing generation of a sentiment, δ obeying the Dirichlet distribution with the hyper parameter μ, that is, δ□ Dirichlet (μ);

c. For Each Word w in the Document:

i. Selecting the topic z, where z obeys the multinomial distribution Multinomial ($\theta_d$);

ii. Given the topic z, selecting the sentiment s, where s obeys the multinomial distribution Multinomial ($\delta_{dz}$);

iii. When the topic is z and the sentiment is s, selecting the word w, where w obeys the multinomial distribution Multinomial ($\varphi_{zs}$);

1.2. Sentiment Dictionary

The sentiment dictionary refers to words with sentiment tendencies, which are also called evaluation words or polarity words. For example, "good" and "bad" are two words with obvious commendatory and derogatory meanings. Sentiment words are usually used in the review text to express the sentiment tendencies of the reviewers. Therefore, the sentiment words in the review text are very important for sentiment analysis. Sentiment word identification and polarity determination have attracted the attention of researchers in the field of sentiment analysis.

In the case of excluding a negative expression structure, the commendatory sentiment words "good, satisfied" of the sentiment words "good, bad, disappointed, satisfied" only appear in the positive sentiment category, while the derogatory sentiment worlds "bad, disappointed" only appear in the negative sentiment category. Because of this characteristic of sentiment words, we introduce a seed sentiment dictionary into the model to initialize the sentiment labels of the words, achieving more accurate sentiment mining for the review text.

TABLE 1

Sentiment seed words good, nice, excellent, positive, fortunate, correct, superior
bad, nasty, poor, negative, unfortunate, wrong, inferior As shown in Table 1, we use a positive sentiment dictionary and a negative sentiment dictionary. We have used a Turney's work dictionary that contains 7 positive sentiment words and 7 negative sentiment words.

1.3 Solve the Model

We perform parameter estimation for the STM model by the Gibbs Sampling method. The Gibbs Sampling method is used such that the STM model is converged to a stable state after a sufficient number of iterations. When a appropriate number of iterations is determined, the topic labels and sentiment labels assigned by the model to each word at this time can be maximally approximate to the actual situation of the text.

In the STM model, we need to estimate three hidden variables, which are: a document-topic distribution θ, a topic-sentiment distribution δ, and a topic-sentiment-word distribution φ. In order to get these three hidden variables, we need to use the Gibbs Sampling method for reasoning. The parameter estimation process can be performed in the following three steps:

(1) $\alpha \rightarrow \vec{\theta} \rightarrow z_{m,n}$, which represents two structures: $\vec{\theta} \square$ Dirichlet ($\alpha$) and $z_{m,n} \square$ Multinomial($\vec{\theta}$). Moreover, the generation processes for different documents are mutually independent. Therefore, for each document, the topic probability may be generated according to formula (1):

$$p(\vec{z}|\alpha) = \prod_{k=1}^{K} p(\vec{z_m}|\alpha) = \prod_{k=1}^{K} \frac{\Delta(\vec{n_{mk}} + \alpha)}{\Delta(\alpha)} \quad (1)$$

In the above formula $\vec{n_{mk}} = (N_m^{(1)}, N_m^{(2)}, \ldots, N_m^{(K)})$, $N_m^{(k)}$ represents the number of words belonging topic k in the document m, $\square(\alpha)(\alpha=\{\alpha_1, \alpha_2, \ldots \alpha_n\})$, which is a normalization factor of Dirichlet distribution Dirichlet ($\alpha$). That is to say, $\square\alpha$ can be calculated by formula (2):

$$\Delta \alpha = \int \prod_{k=1}^{K} p_k^{\alpha_k - 1} d\vec{p} \quad (2)$$

(2) $\beta \rightarrow \vec{\delta} \rightarrow s_{m,n}$, which includes two structures: $\mu \rightarrow \vec{\delta}$, $\vec{\delta_k} \rightarrow s_{m,n}$. $\mu \rightarrow \vec{\delta}$ corresponds to a Dirichlet structure, and $\mu \rightarrow \vec{\delta_k} \rightarrow s_{m,n}$ corresponds to a multinomial distribution. Therefore, $\mu \rightarrow \vec{\delta} \rightarrow s_{m,n}$ is a Dirichlet-multinomial conjugated structure. We assume that the generation process of sentiment is dependent on the topic. Once the topic is determined, the generation of sentiment can be calculated according to formula (3):

$$p(\vec{s}|\vec{z}, \mu) = \prod_{t=1}^{T} p(\vec{s_t}|\vec{z_k}, \mu) = \prod_{t=1}^{T} \frac{\Delta(\vec{n_{mkt}} + \mu)}{\Delta(\mu)} \quad (3)$$

In the formula $\vec{n_{mkt}} = (N_{m,k}^{(1)}, N_{m,k}^{(2)}, \ldots, N_{m,k}^{(t)})$, $N_{m,k}^{(t)}$ represents the number of words belonging to the topic k and the sentiment t in the document m.

(3) $\beta \rightarrow \vec{\varphi} \rightarrow w_{m,n}$, which has two structures: $\vec{w_{m,n}} \square$ Multinomial ($\vec{\varphi}$), $\vec{\varphi} \square$ Dirichlet ($\beta$). We use a word as a sampling unit so that words are mutually independent. The word probability generation can be calculated according formula (4).

$$p(\vec{w}|\vec{z}, \vec{s}, \beta) = \prod_{w=1}^{V} p(\vec{z_t}|\vec{z_k}, \vec{s}, \beta) = \prod_{w=1}^{V} \frac{\Delta(\vec{n_{bw}} + \beta)}{\Delta(\beta)} \quad (4)$$

where, $\vec{n_{bw}} = (N_{k,t}^{(1)}, N_{k,t}^{(2)}, \ldots, N_{k,t}^{(V)})$, $N_{k,t}^{(V)}$ represents the number of words assigned to the topic k, and the sentiment t.

By performing comprehensive consideration for formulas (1), (3) and (4), the joint probability distribution of hidden variables can be obtained according to the following formula (5).

$$p(w, z, s|\alpha, \mu, \beta) = p(w|z, s, \beta)p(s|z, \mu)p(z|\alpha) = \quad (5)$$
$$\prod_{k=1}^{K} \frac{\Delta(\vec{n_{mk}} + \alpha)}{\Delta(\alpha)} \prod_{t=1}^{T} \frac{\Delta(\vec{n_{mkt}} + \mu)}{\Delta(\mu)} \prod_{w=1}^{V} \frac{\Delta(\vec{n_{ktw}} + \beta)}{\Delta(\beta)}$$

Based on formula (5), formula (6) can be obtained by the Gibbs sampling method.

$$p(z_i = k, s_i = t | z_{-i}, s_{-i}, w, \alpha, \beta) \propto p(z_i = k, s_i = t, w_i = v | z_{-i}, s_{-i}, w_{-i}, \alpha, \beta)$$

$$= \frac{\{\vec{n_{mk}}\}_{-i} + \alpha}{\sum_K (\{\vec{n_{mk}}\}_{-i} + \alpha)} \frac{\vec{n_{mkt}} + \mu}{\sum_T (\{\vec{n_{mkt}}\}_{-i} + \mu)} \frac{\vec{n_{ktw}} + \beta}{\sum_V (\{\vec{n_{ktw}}\}_{-i} + \beta)} \quad (6)$$

In formula (6), $\{\vec{n_{mk}}\}_{-i}$, $\{\vec{n_{mkt}}\}_{-i}$, $\{\vec{n_{bw}}\}_{-i}$ is frequency statistic amounts of the words, and the i-th word should be excluded during counting.

The approximate probability distribution of document-topic in the document m is:

$$\theta_m = \frac{\{\overrightarrow{n_{mk}}\}_{-i} + \alpha}{\sum_K (\{\overrightarrow{n_{mk}}\}_{-i} + \alpha)} \quad (7)$$

When the topic in the document m is k, the approximate probability distribution of topic-sentiment is:

$$\delta_k = \frac{\{\overrightarrow{n_{mkt}}\}_{-i} + \mu}{\sum_T (\{\overrightarrow{n_{mkt}}\}_{-i} + \mu)} \quad (8)$$

When the topic is k and the sentiment is t, the approximate probability distribution of the topic-sentiment-word is:

$$\varphi_{k \times t} = \frac{\{\overrightarrow{n_{ktw}}\}_{-i} + \beta}{\sum_V (\{\overrightarrow{n_{ktw}}\}_{-i} + \beta)} \quad (9)$$

The STM model is a generation model. During the generation process of each document d, the STM model firstly selects the topic k from the document-topic distribution $\theta_d$ and selects the sentiment t from the topic-sentiment distribution $\delta_k$ after the topic k is determined; after the topic k and the sentiment t are given, each word in the document is generated from the topic-sentiment-word distribution $\varphi_{k \times t}$. The solving algorithm of the STM model based on the Gibbs sampling is as follows:

---

Algorithm 1: Solving algorithm of STM model based on Gibbs sampling
Input: 1) hyper-parameters α, μ, β; 2) maximal iterations (denoted as maxIter) of Gibbs sampling;
Output: matrixes θ, δ, φ
Process:
1)   Randomly initializing matrixes θ, δ, φ
2)   Repeat
3)     Cycling from 1 to maxIter
4)       For all documents
5)         For all words in the document
6)           Sampling new topic according to formula (1)
7)           Sampling new sentiment according to formula (2)
8)           Updating statistic amounts: $\{\overrightarrow{n_{mk}}\}_{-i}, \{\overrightarrow{n_{mkt}}\}_{-i}, \{\overrightarrow{n_{ktw}}\}_{-i}$
9)           Calculating θ according to formula (7)
10)          Calculating δ according to formula (8)
11)          Calculating φ according to formula (9)
12)        End cycle
13)      End cycle
14)    End cycle
15) Until the Gibbs sample converges

---

During the STM model solution iteration process, each iteration process follows the process described above. At each iteration, we perform frequency statistics on the results after the last iteration is completed, calculate the distributions θ, δ, and φ based on the formula, and then select corresponding topic and sentiment labels for each word from the distributions to update the word's topic and sentiment dimensions. The first frequency statistics are performed based on the initialization results of the model. The model initialization is to randomly assign topic dimensions to the document and all the words in the document. In the model initialization work, the distributions of sentiments are not all random. Since we want to fuse sentiment prior information into the model, the initialization process of sentiment depends on the sentiment seed dictionary. The initialization process of the specific sentiment dimension is as follows:

a. It is determined whether each word in the document appears in the sentiment seed dictionary. If yes, it is recorded that whether the word's sentiment polarity is positive or negative.

b. Sentiment polarity is randomly assigned to the words that do not appear in the sentiment seed dictionary.

2. Deceptive Review Detection Experiment and Result Analysis

To prove the performance of STM model according to the present invention and to further compare the STM model with a typical feature-based model in the field of deceptive review detection, such as unigram model, character n-grams in token model, POS model, LDA model, and the JST model, we design and implement three sets of experiments. In the first set of experiments, we compare the model generalization capabilities of the LDA, JST, and STM models to determine their different perplexities. These three models are a generative probability model. As these models are affected by two parameters at the same time, that is, affected by the number of Gibbs Sampling iterations and the number of topics, we focus on observing the influence of the changed two parameters on the three models based on the perplexity in the first set of experiments. The second set of experiment is performed with the purpose of evaluating the classification performances of the models on the balanced and unbalanced datasets according to the indicators such as Precision, Recall, and F1-Score which are often used in a classification task. The aim of the third set of experiments is to verify the performances of the model of the present invention and the reference models in datasets of different fields.

2.1 Dataset and Experimental Device

The experimental dataset used in the present invention are labeled English review text obtained from a foreign review website Yelp. Table 2 shows the statistic characteristics of the dataset. The dataset has labels: true or false. The deceptive reviews are obtained by a filter of the Yelp website. The true reviews are reviews retained in the merchant webpage. These reviews come from the datasets of two fields, i.e., hotel and restaurant. In the field of hotel, there are totally 780 deceptive reviews and 5,078 true reviews. In the field of restaurant, there are totally 8,308 deceptive reviews and 58,716 true reviews. Based on the statistic results of Table 2, we can see that the category distribution of the Yelp dataset is extremely unbalanced. Those with 'ND' denote natural distribution. Researchers have known that highly unbalanced dataset often results in poor model training effects. Therefore, to build a better model, we construct unbalanced datasets based on the down-sampling technology. The down-sampling technology is usually employed to randomly select some instances from the category with a large data amount and form an unbalanced training dataset with relatively balanced category distribution together with the category with a small data amount. In Table 2, the unbalanced dataset and balanced dataset are labeled with "#" and "*", respectively. To verify the applicability of the deceptive review detection model, experiment is performed on the datasets of the two fields. The hotel dataset is used in the first and second set of experiments, while the restaurant dataset is used in the third set of experiments.

TABLE 2

Dataset for review detection

| Data set | Deceptive | True | Deceptive % | Total reviews | experiments |
|---|---|---|---|---|---|
| Hotel$^{ND}$ | 780 | 5078 | 13.3 | 5858 | |
| Restaurant$^{ND}$ | 8303 | 58716 | 12.4 | 60719 | |
| Hotel$^{\#}$ | 780 | 1170 | 40 | 1950 | 3$^{rd}$ set |
| Restaurant$^{\#}$ | 8303 | 12454 | 40 | 20757 | 2$^{nd}$ set |
| Hotel* | 780 | 780 | 50 | 1560 | 3$^{rd}$ set |
| Restaurant* | 8303 | 8303 | 50 | 16606 | 1$^{nd}$ set, 2$^{nd}$ set |

Before implementing the three sets of experiments, we firstly perform pre-processing for the review text data. Because the text is an English review, we perform word segmentation for the reviews only based on the spaces and then remove digits and punctuation symbols. After that, we use the Stanford's analyzer to get the part of speech corresponding to each word.

In the experimental device, all the classification tasks are implemented by using a 5-fold Cross Validation. The models unigram, character n-grams in token, POS, LDA, and JST, are selected as reference models, because these models are typical feature-based models in the field of detection of the deceptive reviews. The Random Forest classifier is adopted for all the classification tasks. Especially, for the high-dimensional feature-based models such as unigram model and character n-grams in token model, we adopt a SVM model because the SVM model is suitable for processing high-dimension feature data.

In all experiments, the optimal parameters are adopted. For the models of unigram, character n-grams in token, and POS, all features are weighted with TF-IDF For the LDA model, we take the topic probability distribution vector (hidden variable θ) as the feature of a review text. For the JST model, we take sentiment-topic joint probability distribution (hidden variable θ) as the feature of a review text. Similarly, we take the sentiment-topic joint probability distribution (hidden variable δ) of the STM model as the feature, which can be calculated according to formula (8). Similar to the configuration of the present invention, Dirichlet prior parameters are assigned with 0.1, 0.01, and 0.1, respectively in the three sets of experiments. Besides, in the experiment of the topic models, the number of topics is assigned with 5, 10, 15, and 20, sequentially. The number of sentiments is assigned with 2.

2.2 Evaluation Criteria

In this experiment, the feature extraction and model training are performed based on the above features and classifier. In order to measure the effects of different features and different classification models, we perform evaluations based on the algorithm of the field of machine learning. The three basic indicators commonly used are: Precision, Recall, and F1-Score.

Precision is used to measure the query accuracy of the retrieval system, which is a ratio of the number of related documents retrieved to the total number of retrieved documents.

$$\text{Precision} = \frac{TP}{TP + FP} \quad (10)$$

The Recall is a ratio of the number of retrieved related documents to the number of all relevant documents in the document library. The ratio is used to measure the recall rate of the retrieval system.

$$\text{Recall} = \frac{TP}{TP + FN} \quad (11)$$

F1-Score is usually a single measure criteria obtained by combining the precision and the recall in a combination manner F1-Score is calculated as follows:

$$F1 - \text{score} = \frac{2 \times \text{Precision} \times \text{Recall}}{\text{Precision} + \text{Recall}} \quad (12)$$

In the formulas, TP refers to the number of positive instances predicted to be positive; FP refers to the number of negative instances predicted to be positive; and FN refers to the number of positive instances predicted to be negative. Because the 5-fold Cross Validation is used in the experiment, Precision, Recall, and F1-Score in the experimental results are all calculated by using a macro-average.

In the information theory, the perplexity is used to measure how good or bad a probability distribution or a probability model prediction sample is and also may be used to compared two probability distributions or probability models at the same time. The LDA model, JST model, and STM model used in this invention are all probability model and therefore we use the perplexity to compare the model prediction capabilities of the three topic models at the same time. Perplexity decreases monotonically along with the similarity of the test data, and is algebraically equivalent to the inverse of the geometric mean of the similarity of each word. A lower Perplexity value indicates that the probability model has a better generalization capability. Formally, for a test set of M documents, Perplexity is calculated as follows:

$$\text{Perplexity}(D_{test}) = \exp\left\{\frac{\sum_{d=1}^{M} \log p(w_d)}{\sum_{d=1}^{M} N_d}\right\} \quad (13)$$

Figure 2:
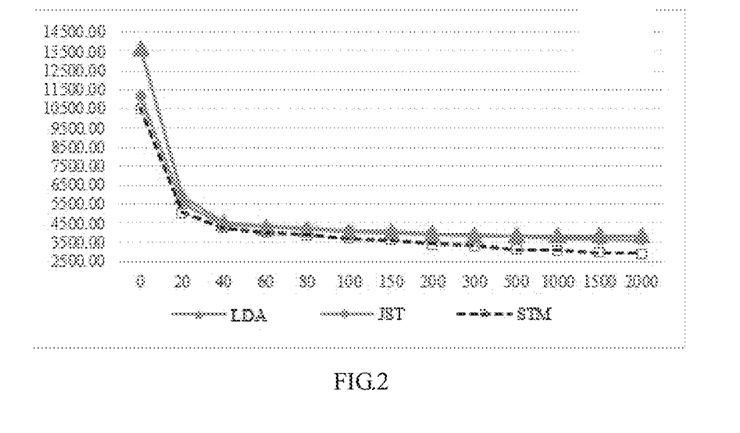
FIG. 2 is a schematic diagram of influence of the iteration number of the Gibbs Sampling of the LDA, JST and STM models on the perplexity.
Figure 3:
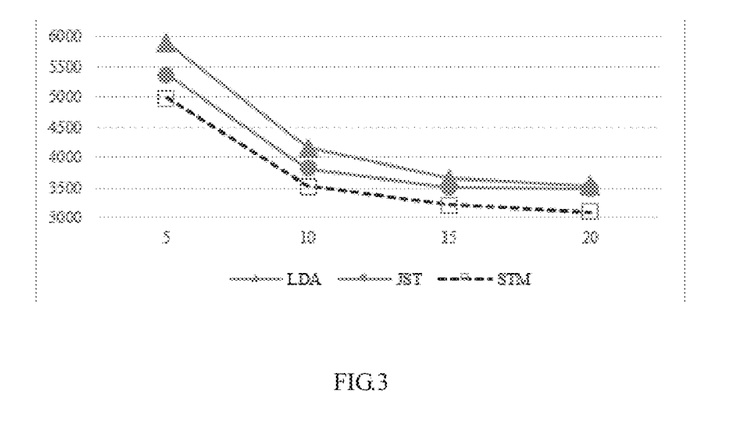
FIG. 3 is a schematic diagram of influence of the number of topics of the LDA, JST and STM models on the perplexity.

2.3. Experimental Result Analysis 2.3.1 Results Obtained with a Changed Number of Gibbs Sampling Iterations and a Changed Number of Topics In the first set of experiments, we changed the number of Gibbs Sampling iterations and the number of topics of the topic model, and observed the changes of the three topic models in Perplexity. FIGS. 2 and 3 show the results from the first set of experiments. In FIG. 2, the abscissa is the number of iterations, and the ordinate is the value of perplexity. As shown in FIG. 2, the values of perplexities of the LDA, JST, and STM models decrease along with the increase of the number of iterations. As we know, a lower perplexity indicates the probability model has a better generalization capability. This shows that the three models tend to converge as the number of iterations increases. The perplexity value of the STM model is always smaller than those of the LDA and JST models, which demonstrates that STM model is superior to the other two models in generalization capability. It should be noted that the descent gradients of the three curves are large when the number of iteration is less than 40. When the number of iterations increases to 500, the curve remains unchanged, which indicates that the probability model is basically converged. Therefore, we set the number of iterations to 500 in the following set of experiments.

We set the number of topics from 5 to 20, and observe the influence of the number of topics on the three topic models. In FIG. 3, the horizontal axis represents the number of topics, and the vertical axis represents the Perplexity value. Similar to FIG. 2, the Perplexity values of the three topic models in FIG. 3 decrease along with increase of the number of topics. The curve of the STM model is always below the curves of the LDA model and the JST model, which indicates that the generalization capability of the STM model is better than those of the other two topic models. When the number of topics changes from 5 to 10, the curve descends rapidly. When the number of topics reaches 15, the three topic models can be basically converged. When the number of topics changes from 15 to 20, the three curves show little change. In this case, we think that it is appropriate to set the number of topics to 15 in the present invention.

2.3.2 Experimental Results of Models on the Balanced and Unbalanced Datasets

Figure 4A:
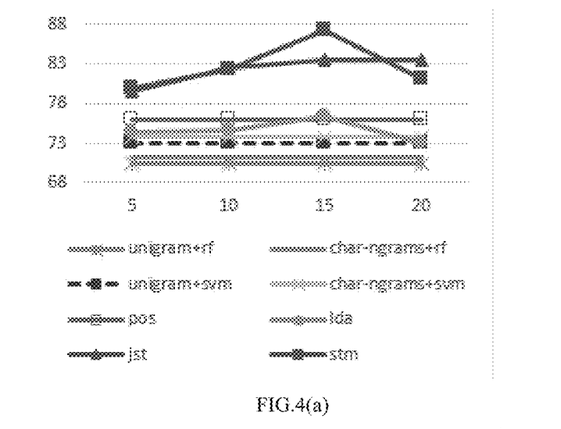
FIG. 4(a), FIG. 4(b) and FIG. 4(c) are effect diagrams of the model on the Precision, Recall, and F1-Score indicators, respectively.
Figure 4B:
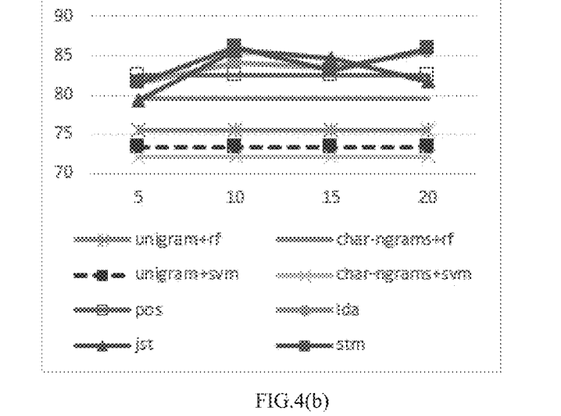
Figure 4C:
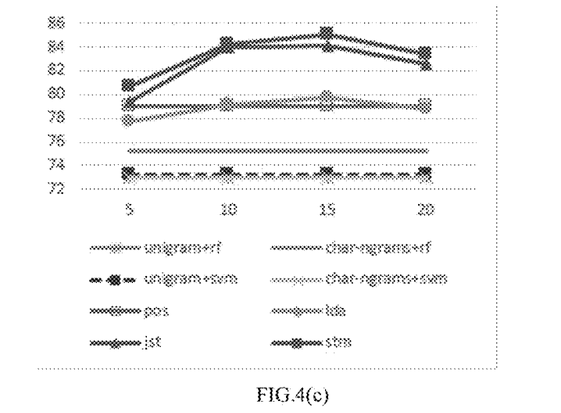
Figure 5A:
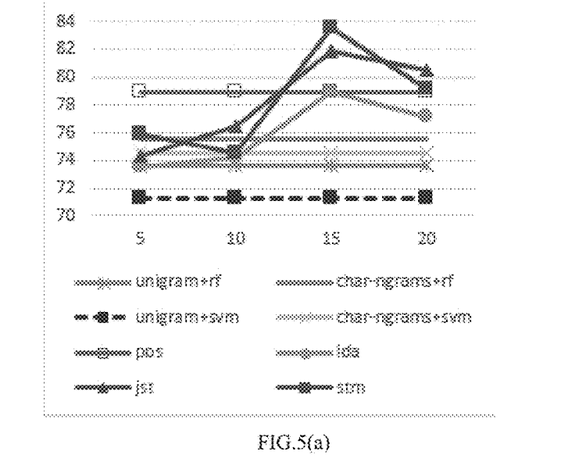
FIG. 5(a), FIG. 5(b) and FIG. 5(c) are effect diagrams of the model on the Precision, Recall, and F1-Score indicators, respectively.
Figure 5B:
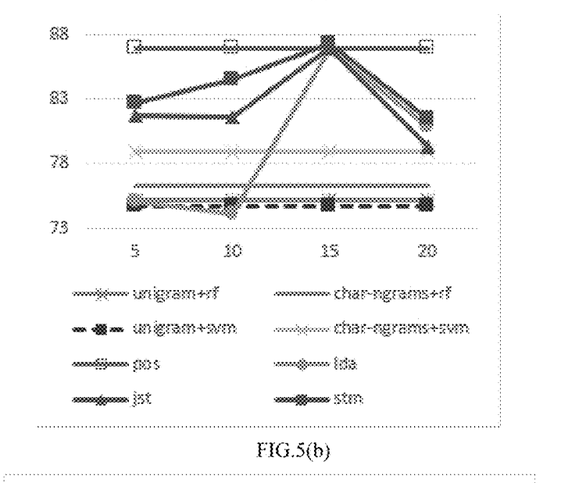
Figure 5C:
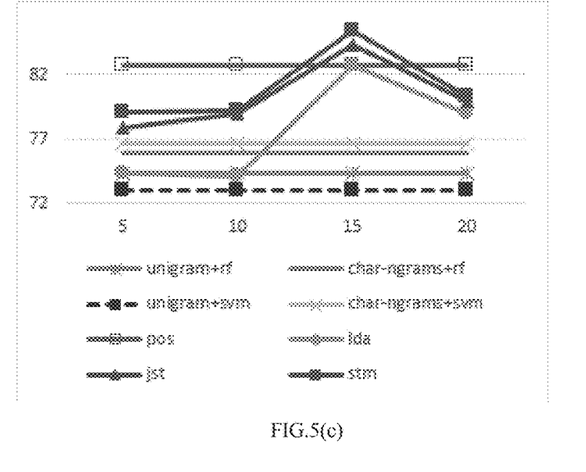

In the second set of experiments, we compare the performances of our model and the reference models on the balanced and unbalanced datasets, respectively. As the LDA, JST and STM models are all influenced by the number of topics, it is necessary to compare the performances of these models under different number of topics. FIGS. 4 and 5 show the experimental results of the models on the balanced and unbalanced datasets, respectively, when the number of topics ranges from 5 to 15. The horizontal axis is the number of topics. In addition, the vertical axis represents the values of Precision(P), Recall(R), and F1-Score(F) of the experimental results. From the results of the first set of experiments, it can be seen that most topic models can achieve their good performances when the number of topics is set to 15. To further compare the effects of these models, we list the results of models in Table 3 when the number of topics is set to 15. All the values in following figures and tables are represented in percentage (%).

greatly influenced by the number of topics. Through comparison of the results of the LDA model (76.34, 85.53, and 79.77), the JST model (83.5, 84.75, and 84.12), and the STM model (87.15, 83.02 and 85.03), it can be seen that simultaneous consideration of sentiment and topic information can help improve performances. Similarly, the STM model is better in performance than other reference models when applied to the balanced hotel data set. Therefore, we can conclude that the sentiment-topic joint probability distribution can further improve the detection performance of deceptive reviews.

Conclusion 1: In the deceptive review detection, the STM model used in the experiment with the balanced hotel dataset is better than all reference models in performance.

b Results Over Unbalanced Hotel Dataset

FIG. 5 show the performances of reference models on the unbalanced hotel dataset. On the unbalanced dataset of the hotel field, we verified that all models perform worse on the unbalanced dataset than on the balanced dataset. The Character n-grams in token model is still better in effect than the unigram model. The POS model is also superior to the unigram model and Character n-grams model because the appearance frequency of part-of-speech usually reflects the genre of text.

When the number of topics is smaller than 15, the performance of the topic-related model is not as good as the POS model. When the number of topics is increased to 15, the three topic models can achieve their optimal performances and outperform the POS model. Therefore, choosing an appropriate number of topics is crucial for the detection effect of deceptive reviews. From the results of the unbal-

TABLE 3

Experimental results of the models with the hotel dataset when the number of topics is 15

| Category | Model | Balanced dataset | | | Unbalanced dataset | | |
|---|---|---|---|---|---|---|---|
| | | P | R | F | P | R | F |
| Topic-unrelated models | Unigram + RF | 71.16 | 75.23 | 73.14 | 65.46 | 73.22 | 69.12 |
| | character n-grams + RF | 72.39 | 78.99 | 75.57 | 67.41 | 69.63 | 68.5 |
| | Unigram + SVM | 74.56 | 76.47 | 75.5 | 64.15 | 68.43 | 66.22 |
| | character n-grams + SVM | 73.82 | 80.38 | 76.96 | 64.79 | 69.03 | 66.84 |
| | POS (Ott, Choi et al. 2011) | 74.06 | 78.89 | 76.39 | 72.89 | 80.27 | 76.4 |
| Topic-related models | LDA | 77.76 | 77.14 | 77.45 | 73.75 | 77.74 | 75.69 |
| | JST | 80.5 | 82.19 | 81.34 | 72.24 | 74.19 | 73.2 |
| | UTSJ (this paper) | 82.29 | 85.62 | 83.92 | 75.25 | 80.57 | 77.82 | a Results Over Balanced Hotel Dataset

Firstly, we will analyze the effect of the topic-unrelated model. The character n-grams in token model (71.3, 79.52, and 75.19) is better in effect than the unigram model (70.42, 75.63 m and 72.93) when we use Random Forest Classifier. This is because the character n-grams in token model can not only inherit the advantages of the standard n-grams model, but also obtain fewer features. In comparison, the POS model is better than the unigram and character n-grams in token models, which indicates that simple genre feature method can help detect deceptive reviews.

The LDA model (76.34, 85.53, and 79.77) is also superior to the POS model (75.92, 82.42, and 79.04) because the LDA model can capture semantic information hidden in review text. When the number of topics is set to 20, the Precision of the LDA model decreases sharply and the Recall increases. This indicates that the LDA model is anced data listed in Table 4, we can see that the Precision Recall F1-Score values of the STM model are the largest.

Conclusion 2: When the STM model is applied to the unbalanced dataset, the performance is the best and the advantages are more obvious 2.3.3 Experimental Results of the Models Over the Datasets of Different Fields To further compare the applicabilities of different models in different fields, we perform the third set of experiments on the restaurant dataset. The data amount of the restaurant dataset is larger than that of the hotel dataset. The third set of experiments is set in the same manner as the second set of experiments. FIGS. 6 and 7 illustrate the results of the third set of experiments. The horizontal axis is the number of topics. In addition, the vertical axis represents the values of Precision, Recall, and F1-Score obtained by the models. Similarly, we list in Table 5 the results when the number of topics is set to 15. All the values in following figures and tables are represented in percentage (%).

a Experimental Results Over Balanced Restaurant Dataset

Figure 6A:
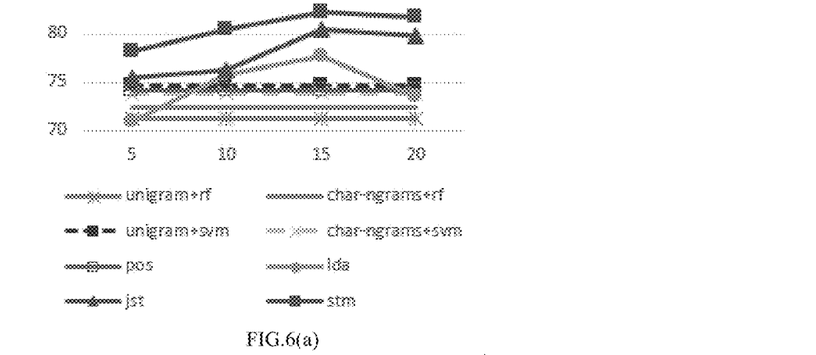
FIG. 6(a), FIG. 6(b) and FIG. 6(c) are effect diagrams of the model on the Precision, Recall, and F1-Score indicators, respectively.
Figure 6B:
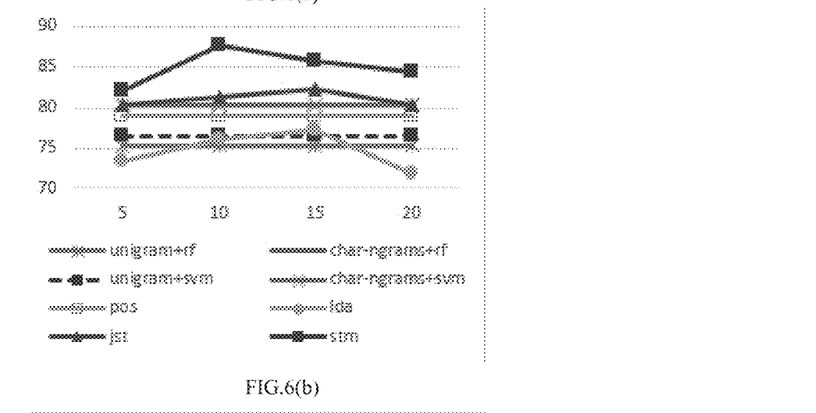
Figure 6C:
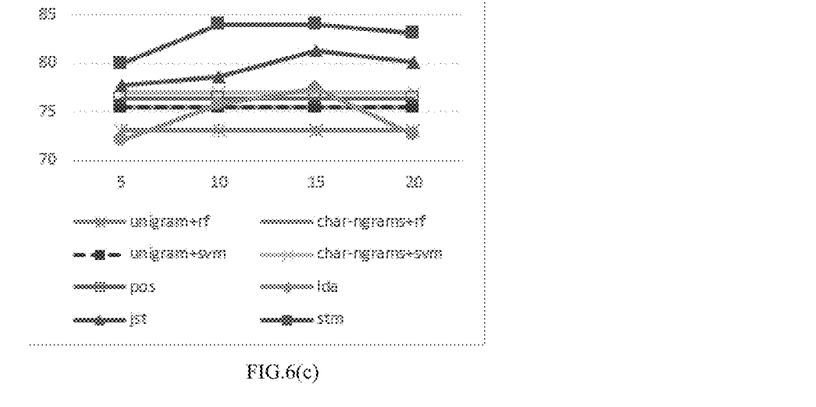
Figure 7A:
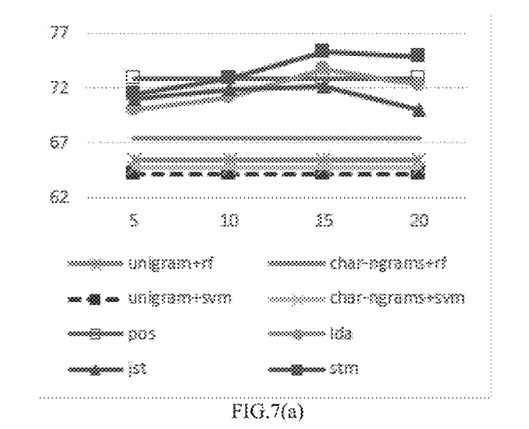
FIG. 7(a), FIG. 7(b) and FIG. 7(c) are effect diagrams of the model on the Precision, Recall, and F1-Score indicators, respectively.
Figure 7B:
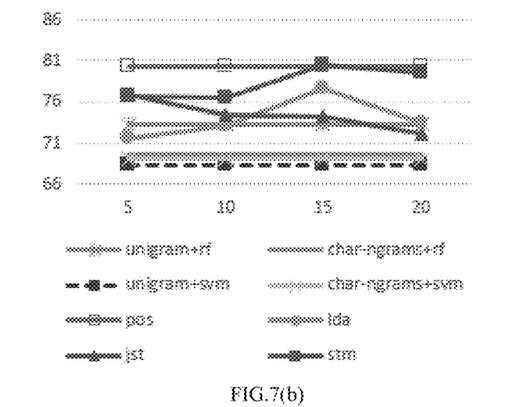
Figure 7C:
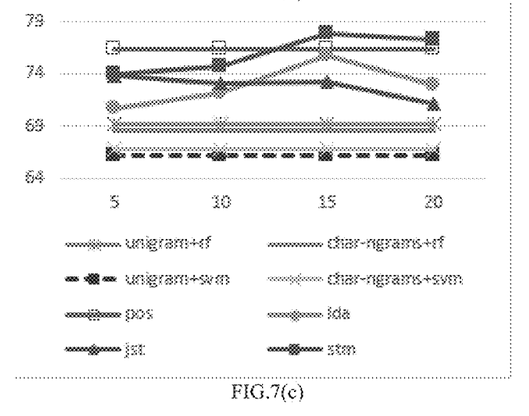

In FIG. 6, the unigram, character n-grams in token, and POS models are not influenced by the number of topics. From FIG. 6(a) and Table 4, we can see that when Random Forest classifier is used, character n-grams in token (72.39, 78.99, and 75.57) model performs better than the unigram model (71.16, 75.23, and 73.14) in Precision, Recall, and F1-Score. The performance of the Character n-grams in token model is still better than the unigram model when SVM classifier is used. This is because the character n-grams in token model better distinguishes the review-writing styles of the deceptive reviewers than the n-grams model. In comparison, the POS (74.06, 78.89, 76.39) model is better in performance than the unigram and character n-grams in token models, because the POS model utilizes shallow syntax information hidden in the text and the unigram model and character n-grams in token model only use the context information of words.

Among the three topic-related models, the LDA model is significantly inferior to the JST model (80.5, 82.19, and 81.34) and the STM model (82.29, 85.62, and 83.92) because the JST and STM models consider both topic and sentiment information. By comparing the three sub-graphs of FIG. 6, we can see that the precision of the topic model is improved when the number of topics increases from 5 to 15. When the number of topics reaches 20, the LDA model always has a sharp decline in the three graphs. In comparison, the JST and STM models are more stable. In the three topic models, the curve of the STM model is always above the curves of other benchmark models, regardless of the number of topics. This shows that our model is the best of these models.

construct an unbalanced dataset, it is equivalent to increasing the proportion of positive instance samples in the training set. Therefore, for the unbalanced datasets, it is more difficult to detect deceptive reviews.

By observing the changing trend of the topic model along with the number of topics in the FIG. 7, we found that the JST model performs worse than the LDA model. Besides, the LDA model and the topic model are more easily affected than the STM model. For example, when we set the number of topics to 20, all the values of the Precision, Recall, and F1-score obtained by using the LDA and JST models are smaller than those when the number of topics is set to 15. Instead, the decline of the STM model is relatively small, and basically remains stable. As we can see from the FIG. 7, when the number of topics is assigned with 5 and 10, the curve of the POS model is always above the curves of other models. When the number of topics is set to 15, the performances of topic models are improved. Meanwhile, our STM model is the best among the models. This shows that the number of topics has an effect on the topic model. Only when we set an appropriate number of topics will the performance of topic models be exerted well.

By comparing the results of the balanced dataset and the results of the unbalanced data set listed in Table 4 horizontally, it is easy to find that the results of the unbalanced dataset are correspondingly worse. For example, when we adopt the random forest classifier to perform experiment on the unigram model, the results (65.46, 73.22, and 69.12) of the unbalanced dataset is lower than those (71.16, 75.23 and 73.14) of the balanced dataset. This is reasonable in practice, because true reviews themselves are larger in data amount than the deceptive reviews in a real e-commerce environment resulting in difficult detection of the deceptive reviews. By carefully observing the results of all models under the

TABLE 4

Experimental results of the models with the restaurant dataset when the number of topics is 15

| Category | Model | Balanced dataset | | | Unbalanced dataset | | |
|---|---|---|---|---|---|---|---|
| | | P | R | F | P | R | F |
| Topic-unrelated models | Unigram + RF | 71.16 | 75.23 | 73.14 | 65.46 | 73.22 | 69.12 |
| | character n-grams + RF | 72.39 | 78.99 | 75.57 | 67.41 | 69.63 | 68.5 |
| | Unigram+ SVM | 74.56 | 76.47 | 75.5 | 64.15 | 68.43 | 66.22 |
| | character n-grams + SVM | 73.82 | 80.38 | 76.96 | 64.79 | 69.03 | 66.84 |
| | POS (Ott, Choi et al. 2011) | 74.06 | 78.89 | 76.39 | 72.89 | 80.27 | 76.4 |
| Topic-related models | LDA | 77.76 | 77.14 | 77.45 | 73.75 | 77.74 | 75.69 |
| | JST | 80.5 | 82.19 | 81.34 | 72.24 | 74.19 | 73.2 |
| | UTSJ (this paper) | 82.29 | 85.62 | 83.92 | 75.25 | 80.57 | 77.82 | b Experimental Results Over Unbalanced Restaurant Dataset

From FIG. 7 and Table 4, we can see that the POS model is superior in effect to the unigram and character n-grams in token models as the POS model utilizes part-of-speech feature of words. Moreover, when we adopt the Random Forest classifier, the character n-grams in token model (67.41, 69.63, and 68.5) has a decrease in accuracy, and an increase in the recall rate and F1 value compared to the unigram model (65.46, 73.22, 69.12). When we use a SVM classifier, the character n-grams in token model (64.79, 69.03, and 66.84) is superior to the unigram model (64.15, 68.43, and 66.22), but still inferior to the results from the balanced dataset. We think that this phenomenon is caused by the differences of the dictionary order of magnitude between the balanced and unbalanced datasets. When we unbalanced dataset listed in Table 4, we can see that our STM model is the best among these models.

The above experimental results support our hypothesis that "sentiment depends on the topic" and also prove useful in mining the thought trajectory of users writing reviews. Furthermore, from the analysis of these results, we can conclude that the sentiment-topic joint probability feature can improve the detection performance of deceptive reviews. In particular, the performances of all models on the unbalanced dataset are correspondingly worse than the experimental effects on the balanced dataset, which also explains why it is difficult to detect deceptive reviews in a real e-commerce environment. Compared with other models, our model shows great advantages in processing the unbalanced datasets, especially in large samples (unbalanced datasets of restaurant). This also shows that our model is suitable for application in real e-commerce environments.

Conclusion 3 In the data of different fields, the STM model is superior to other reference models.

Conclusion 4 Compared to other models, the STM model shows great advantages in processing the unbalanced large sample datasets. Therefore, the STM model is more suitable for application in real e-commerce environment.

Of course, the above description is not intended to limit the present invention, and the present invention is not limited to the above examples. Changes, modifications, additions or replacements made by those skilled in the art within the scope of the present invention should all fall in the scope of protection of the present invention.

The invention claimed is:

1. A method for detecting deceptive e-commerce reviews based on a sentiment-topic joint probability, wherein A STM model is a sentiment-topic joint probability model which is a 9-tuple, STM=($\alpha$, $\beta$, $\mu$, $\bar{\theta}$, $\bar{\delta}$, $\bar{\varphi}$, $z_{m,n}$, $s_{m,n}$, $w_{m,n}$), wherein:

$\alpha$ is a hyper parameter that reflects a relative strength hidden between topic and sentiment;

$\mu$ is a hyper parameter that reflects a sentiment probability distribution over topic;

$\beta$ is a hyper parameter that reflects a word probability distribution;

$\bar{\theta}$ is a K-dimensional Dirichlet random variable, which is a topic probability distribution matrix;

$\bar{\delta}$ is a K*T-dimensional Dirichlet random variable, which is a sentiment probability distribution matrix;

$\bar{\varphi}$ is a K*T*N-dimensional Dirichlet random variable, which is a word probability distribution matrix;

$z_{m,n}$ is a topic to which the n-th word of a document m belongs;

$s_{m,n}$ is a sentiment to which the n-th word of the document m belongs;

$w_{m,n}$ is a basic unit of discrete data, which is defined as a word indexed by n in the document m;

the method for detecting deceptive e-commerce reviews based on a sentiment-topic joint probability comprising the following steps:

at step 1: initializing the hyper parameters $\alpha$, $\beta$, $\mu$ of the STM model;

at step 2: setting the appropriate numbers of the topic and the sentiment, and maximum iterations of Gibbs sampling;

at step 3: training the STM model until the model stabilizes and converges;

at step 4: inputting the sentiment probability distribution matrix $\bar{\delta}$ calculated by the STM model as a feature into a classifier for training;

at step 5: inputting new unlabeled samples into the STM model and training the STM model to calculate the sentiment probability distribution matrix $\bar{\delta}$ of the new unlabeled samples as the feature;

at step 6: inputting the sentiment probability distribution matrix $\bar{\delta}$ of the new unlabeled samples into the trained classifier for prediction; and at step 7: outputting new sample labels through the classifier.

* * * * *